(12) United States Patent
Tsubakihara (10) Patent No.: US 8,134,607 B2
(45) Date of Patent: Mar. 13, 2012

(54) RECORDING APPARATUS

(75) Inventor: Kazuyuki Tsubakihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1379 days.

(21) Appl. No.: 11/695,908

(22) Filed: Apr. 3, 2007

(65) Prior Publication Data

US 2007/0229674 A1 Oct. 4, 2007

(30) Foreign Application Priority Data

Apr. 4, 2006 (JP) .................................. 2006-103649

(51) Int. Cl.
*H04N 5/225* (2006.01)
*H04N 5/775* (2006.01)
*H04N 5/765* (2006.01)

(52) U.S. Cl. ...................... 348/220.1; 386/230; 386/231

(58) Field of Classification Search .................. None
See application file for complete search history.

(56) References Cited

U.S. PATENT DOCUMENTS

| | | | |
|---|---|---|---|
| 2001/0006579 A1* | 7/2001 | Inoue et al. | 386/120 |
| 2002/0197067 A1* | 12/2002 | Ohnishi | 386/120 |
| 2003/0170009 A1* | 9/2003 | Itoh et al. | 386/111 |
| 2004/0096114 A1* | 5/2004 | Tomita et al. | 382/239 |
| 2005/0083414 A1* | 4/2005 | Hidaka et al. | 348/220.1 |

FOREIGN PATENT DOCUMENTS

JP 2004-201170 7/2004

* cited by examiner

*Primary Examiner* — Jefferey Harold
*Assistant Examiner* — Sean Haiem
(74) *Attorney, Agent, or Firm* — Canon U.S.A., Inc. IP Division (57) ABSTRACT

A recording apparatus of the present invention includes a recording unit for recording in a recording medium, motion image data in accordance with a predetermined movie recording method and recording still image data in accordance with a still image recording method different from the movie recording method, a conversion motion image generation unit for generating conversion motion image data in accordance with the movie recording method with use of the still image data recorded in the recording medium, and a sub-information generation unit for generating sub-information data related to the still image data that is used for the conversion motion image data generated by the conversion motion image generation unit, in which the recording unit records the conversion motion image data and the sub-information data in the recording medium in accordance with the movie recording method in a multiplexing manner.

14 Claims, 6 Drawing Sheets

RECORDING APPARATUS

BACKGROUND OF THE INVENTION

1. Field of the Invention

The present invention relates to a recording apparatus, and more particularly to a technology suitably used for an apparatus for recording a motion image and a still image in a recording medium.

2. Description of the Related Art

In recent years, video cameras for recording a motion image and a still image on a disc medium such as a DVD are put in practice. When the DVD is used as a recording medium used for such a video camera, for example, the motion image is encoded and compressed on the basis of the MPEG method to be recorded in a DVD video format or a DVD video recording (VR) format.

On the other hand, the still image is encoded and compressed on the basis of the JPEG method to be recorded in accordance with a recording format called DCF (Design rule for Camera File system) in general cases. In this way, in order to reproduce the motion image and the still image recorded in accordance with the DVD video format or the still image recording format, decoders or reproduction functions corresponding to different recording systems are necessary.

In contrast to this, in almost all the cases, a general DVD player has only a motion image reproduction function. For that reason, for the cases where the still image is recorded, there is a problem in that the image cannot be reproduced.

In view of the above, a method is proposed in which the still image data recorded in accordance with the still image recording method is once decoded and then is encoded in accordance with the MPEG method and the data is recorded on the basis of a movie recording method (for example, refer to Japanese Patent Laid-Open No. 2004-201170: corresponding US Patent Laid-Open No. 2005/0083414A1). In this way, by performing the process of converting the still image into the motion image for the recording, even with the general reproduction apparatus without having the still image reproduction function, the recorded still image can be browsed.

However, with the conventional DVD player, the motion image generated by being converted from the still image data can be browsed, but there is a problem in that it is unknown which still image the respective scenes of the converted motion images correspond to.

For that reason, for example, in a case where a preferred still image is desired to be printed, there is a problem in that it is unknown which still image file should be printed.

SUMMARY OF THE INVENTION

The present invention has been made to solve the above-mentioned problems.

According to an aspect of the present invention, when a motion image that is generated by converting still image data is browsed, it is possible to easily recognize information of the original still image corresponding to each scene of the motion image.

In view of the above, according to an aspect of the present invention, a recording apparatus includes: a recording unit configured to record motion image data and still image data in a recoding medium, the recording unit configured to record the motion image data in accordance with a previously determined movie recording method and recording the still image data in accordance with a still image recording method different from the movie recording method; a conversion motion image generation unit configured to generate conversion motion image data in accordance with the movie recording method with use of the still image data recorded in the recording medium; and a sub-information generation unit configured to generate sub-information data related to the still image data that is used when the conversion motion image generation unit generates the conversion motion image data, in which the recording unit records the conversion motion image data and the sub-information data in the recording medium in accordance with the movie recording method in a multiplexing manner.

According to another aspect of the present invention, a recording apparatus includes: a recording unit configured to record motion image data and still image data in a recoding medium, the recording unit configured to record the motion image data in accordance with a predetermined movie recording method and record the still image data in accordance with a still image recording method different from the movie recording method; a conversion motion image generation unit configured to generate conversion motion image data in accordance with the movie recording method with use of the still image data recorded in the recording medium; and a sub-information generation unit configured to generate bitmap data representing a recording date of the still image data that is used for the conversion motion image data generated by the conversion motion image generation unit. The recording unit multiplexes, in accordance with the movie recording method, the bitmap data with the conversion motion image data as subtitle data of the conversion motion image data and records the multiplexed data in the recording medium.

Further features of the present invention will become apparent from the following description of exemplary embodiments with reference to the attached drawings.

DESCRIPTION OF THE EMBODIMENTS

First Exemplary Embodiment

Figure 1:
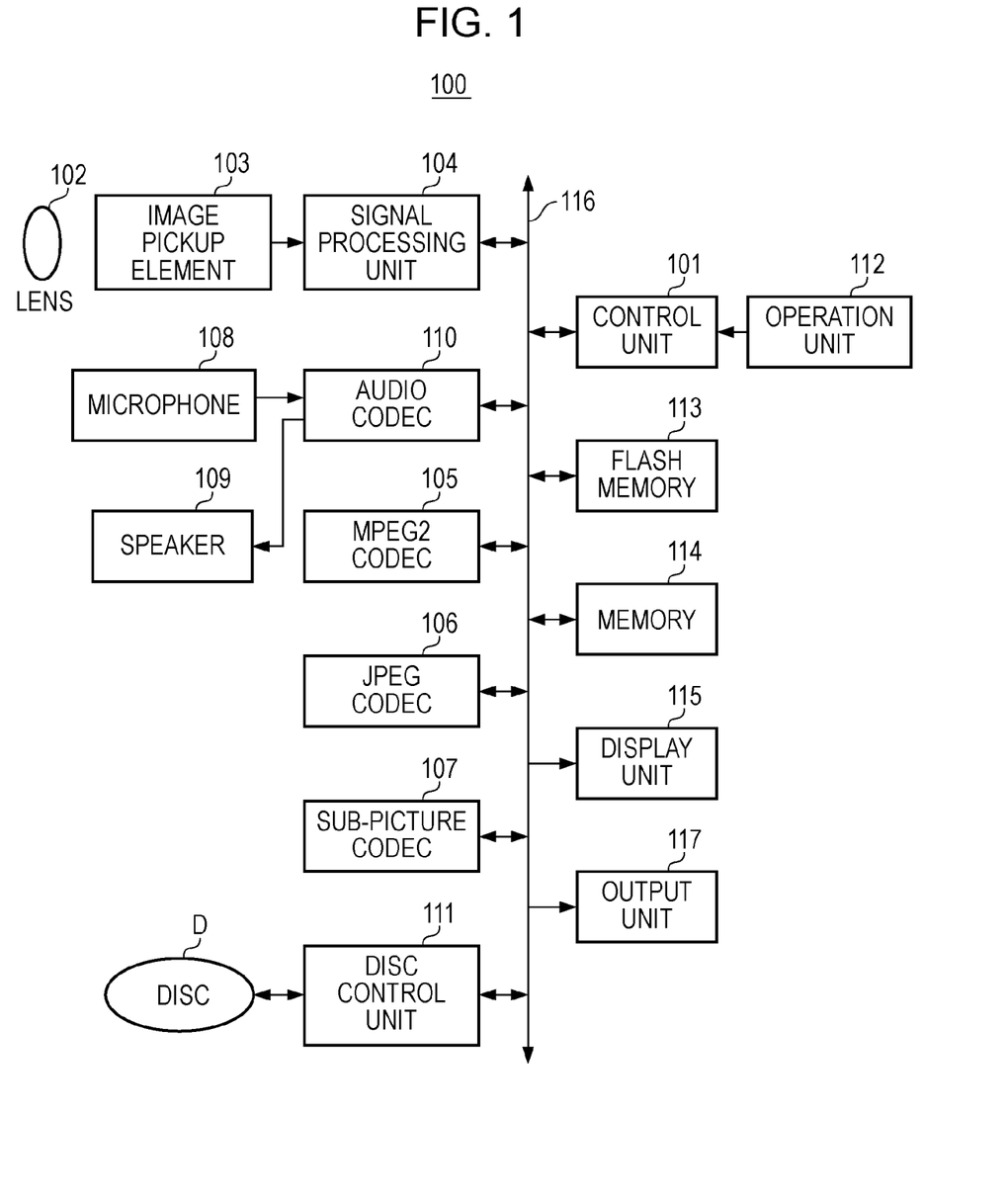
FIG. 1 is a block diagram illustrating a construction of a video camera according to an exemplary embodiment of the present invention.

Hereinafter, a description will be given of exemplary embodiments of the present invention with reference to the drawings. The embodiments to be described below feature an image pick-up apparatus. To be more specific, a description will be given of an example of a DVD video camera. FIG. 1 shows a configuration example of an image pick-up apparatus according to this embodiment.

In FIG. 1, a control unit 101 is used for controlling the image pick-up apparatus. A lens 102 is capable of changing a state of a focal length or an aperture, and an image pickup element 103 is, for example, a charge-coupled device (CCD). The image pickup element 103 has a function of converting a light imaged by way of the lens 102 into an electric signal. A signal processing unit 104 is adapted to perform a predetermined signal process such as white balance or gamma correction on an input motion image signal to temporally record the signal as motion image data or still image data in a memory 114 that will be described later.

An MPEG2 codec 105 is adapted to encode the motion image data temporally recorded in the memory 114 on the basis of an MPEG2 method and decode the reproduced motion image data. A JPEG codec 106 has a function of encoding the still image data temporally recorded in the memory 114 on the basis of a JPEG method and decoding the reproduced still image data to write the data back in the memory 114.

A sub-picture codec 107 has a function of encoding bitmap data on the sub-picture generated by the control unit 101 in the memory 114 and also decoding the reproduced sub-picture data to be written back to the memory 114. For the encoding method, run length coding is used according to this embodiment. A detail of the sub-picture will be described later.

A microphone 108 has a function of converting audio (physical vibration) into an audio signal (electric signal). A speaker 109 has a function of converting the audio signal into audio in contrast to the microphone 108.

An audio codec 110 has a function of encoding the audio signal input from the sub-picture codec 107 in a predetermined encoding format and temporally recording the encoded signal in the memory 114. The audio codec 110 also has a function of decoding the audio signal from the predetermined encoded data held in the memory 114. For the encoding format, according to this embodiment, AC3 (Audio Code number 3) used in the DVD video is used.

A disc control unit 111 records the MPEG2 data, the audio data, and the sub-picture data held in the memory 114 in the DVD disc D in a multiplexing manner. Also, during reproducing, the disc control unit 111 reads out the data recorded in the DVD disc D and separates the MPEG2 data, the audio data, and the sub-picture data from the read out data to be respectively written to a predetermined area of the memory 114. In a similar manner, the disc control unit 111 can also record the still image data in the DVD disc D.

An operation unit 112 is provided with various operation switches such as a power source switch, a recording trigger switch, a still image picking up switch, and a menu switch. As the user operates these switches, operations of a video camera 100 can be instructed.

A flash memory 113 is used for storage of a program operated in the control unit 101, saving of various setting data, and the like. Furthermore, bitmap data used for the above-mentioned sub-picture or the like is also held in the flash memory 113. In this embodiment, this data recorded in the flash memory 113 is held even in a state where the power source of the video camera 100 is turned off, and therefore the flash memory 113 is used for holding management data or the like that needs to be held even after the power supply is turned off.

A memory 114 is used for storing the MPEG2 data, the audio data, the sub-picture data, and the like. The memory 114 is also used as a work memory of the control unit 101. A display unit 115 is used as a display device for decoded movie data and also has a function as a view finder at the time of shooting. In addition, the display unit also has a function as an operation screen to be used when a user operates this apparatus. A data bus 116 is used for access from the control unit 101 to the respective function blocks, data transfer among the respective function blocks via the memory 114, and the like.

An output unit 117 is adapted to output the motion image data and the still image data reproduced from the disc D to an external TV monitor or the like.

In the video camera 100 according to this embodiment structured as described above, the motion image is encoded on the basis of the MPEG2 method and thereafter recorded in the DVD disc D in accordance with a predetermined recording method. According to this embodiment, the motion image data is recorded in accordance with the DVD video format. Also, the still image data is encoded on the basis of the JPEG method to be recorded in the DVD disc D in conformity to the DCF.

To be more specific, during picking up the motion image, when a motion image picking up instruction is issued from the operation unit 112, the control unit 101 controls the respective units to start picking up of image data. The motion image data output from the image pickup element 103 is processed in the signal processing unit 104 and stored in the memory 114. The MPEG2 codec 105 encodes the motion image data stored in the memory 114 on the basis of the MPEG2 method to be stored in the memory 114. Also, the audio data output from the microphone 108 is encoded by the audio codec 110 and stored in the memory 114.

The disc control unit 111 adds various additional information to the motion image data and the audio data stored in the memory 114 and converts the data into a mode that follows the recording format to be recorded in the disc D.

Then, during the still image picking up, the operation unit 112 issues an instruction of a still image picking up, the control unit 101 controls the signal processing unit 104 to store one frame of the image data output from the image pickup element 103 as the still image data in the memory 114. The JPEG codec 106 encodes the still image data stored in the memory 114 on the basis of the JPEG method to be stored in the memory 114.

The disc control unit 111 adds various additional information to the still image data stored in the memory 114 and converts the data into a mode that follows the recording format to be recorded in the disc D.

Also, at this time, as management information of the still image data, information of recording date, a file name of a file in which the still image data is stored, and the like are recorded in the disc D.

On the other hand, during reproducing the motion image data and the still image data recorded in the above-described manner, the user instructs the display of a reproduction data list from the operation unit 112.

The control unit 101 controls the disc control unit 111 to read out the motion image data and the still image data recorded in the disc D to be stored in the memory 114. Then, a top scene of the motion image data is decoded by the MPEG codec 105 to generate thumbnail data. Also, the still image data is decoded by the JPEG codec 106 to generate thumbnail data of the still image data, which is stored in the memory 114.

The control unit 101 then uses the thumbnail data of the motion image data and the still image data stored in the memory 114 to generate a list screen of representative images to be displayed on the display unit 115.

The user operates the operation unit 112 to select an image to be reproduced from the representative images displayed on the display unit 115 and instructs the reproduction.

The control unit 101 controls the disc control unit 111 to reproduce the data instructed to be reproduced from the disc D. At this time, in a case where the motion image data is reproduced, the motion image data is decoded by the MPEG2 codec 105 and the audio data is decoded by the audio codec 110. The decoded motion image data is displayed on the display unit 115 and the audio data is output from the speaker 109.

Whereas in a case where the still image data is reproduced, the still image data is decoded by the JPEG codec 106 to be displayed on the display unit 115.

Figure 2:
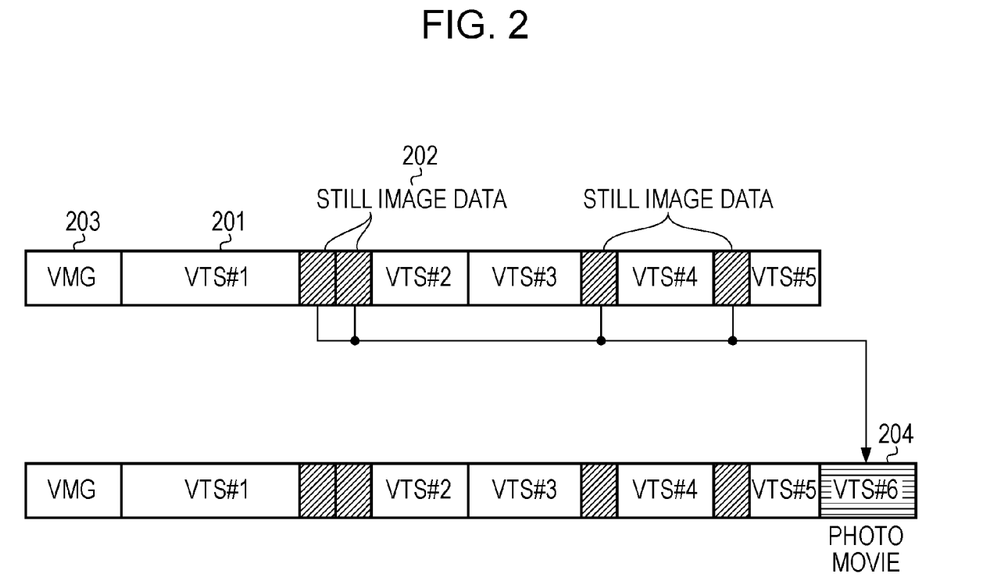
FIG. 2 shows a recording state of a DVD disc.

FIG. 2 shows an example of a recording state of the disc D on which the motion image and the still image are recorded. As shown in FIG. 2, the motion image data recorded in the disc D is composed of one or more titles. The motion image data of each title is composed of one or more chapters. According to this embodiment, the motion image data recorded from the instruction of the recording start to the instruction of the recording end is managed as one chapter. The respective titles are continuously recorded as VTS (Video Title Set) information 201.

On the other hand, still image data 202 can be recorded as one or more pieces of the still image data in an area between titles. Also, in FIG. 2, VMG information 203 is recorded. The VMG (Video Manager) information is management information for the VTS. This information is for realizing continuous reproduction of the respective pieces of VTS information.

A finalize process is performed on the disc on which the motion image data is recorded in accordance with the DVD video format, whereby the disc can be converted into a disc that can be reproduced by a DVD video player. In the finalize process, the VMG is recorded in accordance with the recorded VTS.

According to this embodiment, during finalizing, all of the still image data recorded on the disc D is reproduced. Then, after the reproduced still image data is decoded, the data is encoded on the basis of the MPEG method, and the data is additionally recorded on the DVD 112 as new VTS 204 in accordance with the DVD video format. The VTS thus generated is called a "photo movie."

By reproducing the thus generated photo movie, even the DVD video player without having a still image reproduction function can confirm the state of the recorded still image. The still image data used for generating the photo movie is recorded on the disc D, and therefore in the reproduction apparatus having the still image reproduction function, it is possible to reproduce and also browse the still image data 202.

Furthermore, according to this embodiment, during generating the photo movie, there is a feature in that one or more sub-picture streams are recorded. The sub-picture is bitmap data to be displayed that is overlapped on main video data and recorded as a stream different from the video stream. For that reason, during reproducing, it is possible to select whether or not the sub-picture is displayed on the reproduction image in a multiplexing manner. The sub-picture is, for example, used for displaying a subtitle in a movie.

In addition, a plurality of sub-picture streams are generated with respect to one motion image stream in advance and it is also possible to switch the display contents. For example, it is possible to select the sub-picture streams so as to select a language of the subtitle.

According to this embodiment, the additional information recorded is read out along with the still image data recorded in conformity to the DCF, and a sub-picture is generated on the basis of the additional information. For example, according to this embodiment, the recording date information and the additional information, such as the file name and the file path are reproduced, thus making it possible to generate two sub-pictures using these pieces of the character information as the bitmap data.

Figure 3:
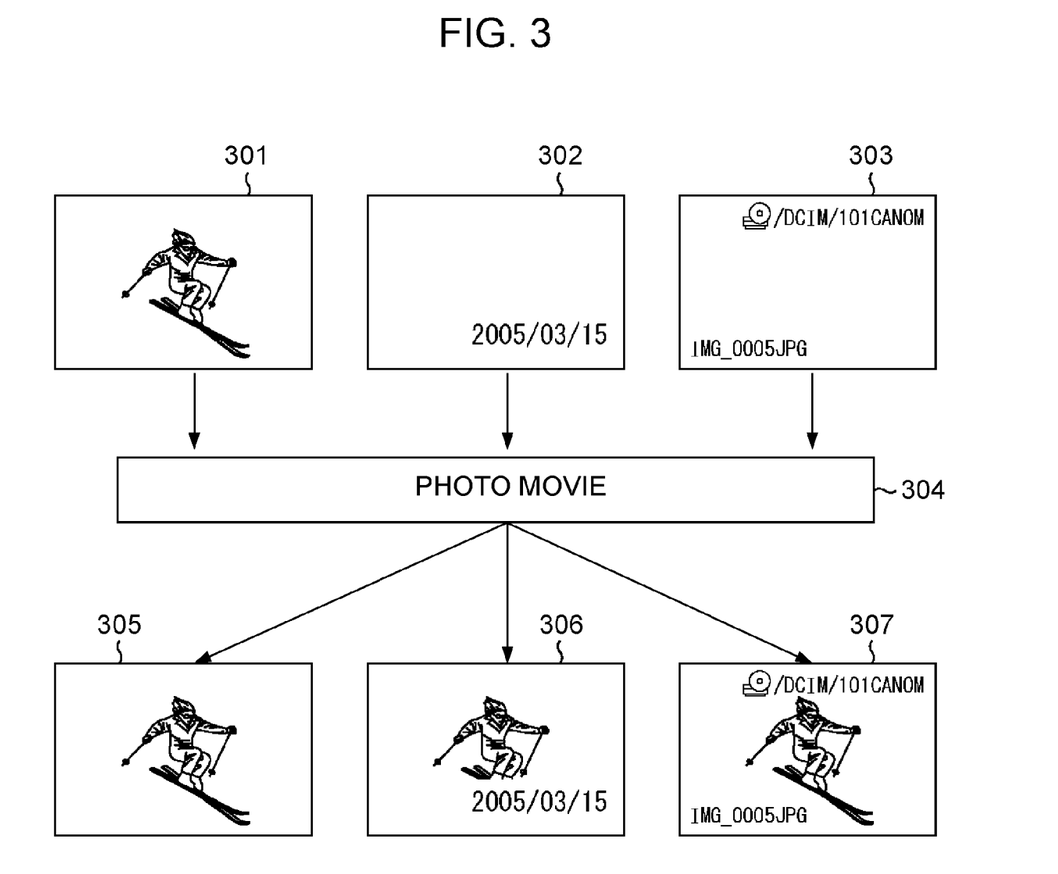
FIG. 3 shows a state of a sub-picture.

FIG. 3 shows a state of the sub-picture to be displayed together with the photo movie.

Data of the thus generated sub-pictures 302 and 303 and a stream of a main image 301 are multiplexed with each other to generate a photo movie 304. The display state of the photo movie 304 can be selected in a variety of modes through an instruction of the user during reproducing as shown in 305 to 307.

Next, with reference to FIG. 4, the structure of the above-described photo movie will be described.

According to this embodiment, the still image data is converted into the I picture based on the MPEG method, the converted I picture is converted so as to be allocated to one chapter of the DVD video format.

Figure 4:
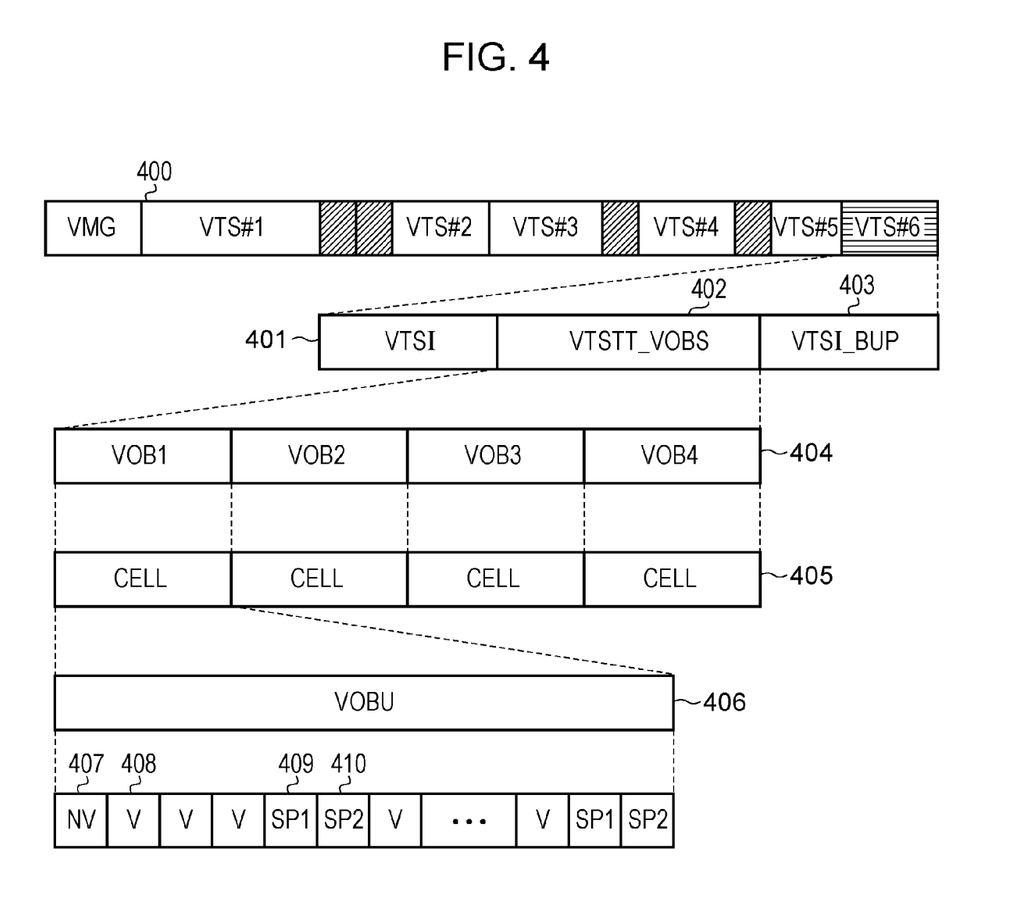
FIG. 4 shows a configuration example of a photo movie.

FIG. 4 shows a state in which according to this embodiment, four still images (four chapters) are converted as one title into a photo movie to be recorded on the disc D.

A state 400 that is similar to the case of FIG. 2 is shown in FIG. 4 in which each of the VTSs shows one title, and VTS#n denotes a VTS in which the n-th title is recorded. Before a process for setting still images as titles and chapters is performed, five titles VTS#1 to 5 are recorded 400, and a photo movie is recorded as the sixth title.

Then, from four pieces of still image data, the still image data based on the I picture format of the MPEG method is formed. The MPEG data (four images in the example of FIG. 4) are bundled to be recorded as VTS#6 on the disc D.

Each of the VTSs includes VTSI (Video Title Set Information) 401, VTSTT_VOBS (Video Object Set for Title) 402, and VTSI_BUP (Video Title Set Information backup) 403. In the VTSTT_VOBS 402, VOB (Video Object) 404 for a plurality of chapters can exist. According to this embodiment, the VTSTT_VOBS 402 includes four VOBs.

The VTSI 401 is management information for managing the chapters to be recorded in the VTSTT_VOBS 402. Also, the VTSI_BUP 403 is backup information of the VTSI, and the content of which is the same as that of the VTSI 401.

Then, in the DVD video format, a plurality of CELLs can exist in each VOB. According to this embodiment, the VOB 404 and the CELL 405 correspond to each other on one on one basis. The one VOB in which the still image of the I picture that is formed from the still image data based on the MPEG method is recorded is configured as one CELL.

That is, such a configuration is adopted that the relation of 1 VOB=1 CELL=1 chapter is established all the time. With the above-mentioned configuration, through a chapter jump operation during reproducing, the displayed still images can be switched, thus realizing the photo movie more convenient to the user. In the CELL, information called Cell Still Time can be stored. When the CELL is a still image, the number of seconds for reproducing the CELL can be set as the Cell Still Time.

Moreover, in the DVD video format, a plurality of VOBUs (Video Object Units) 406 can also exist in the CELL. According to this embodiment, at least one VOBU 406 is stored in the CELL of the VTS in which the still image formed from the still image data of the I picture based on the MPEG method is recorded.

In the head of the VOBU 406, NV_PCK (navigation pack) 407 including data search information for realizing fast-forwarding and fast-rewinding, or the like is stored. Also, following the NV_PCK 407, a plurality of V_PCKs (video packs) 408 and SP_PCKs (sub picture packs) 409 and 410 are multiplexed with each other to be stored in the VOBU 406.

According to this embodiment, in order to record two sub-streams, SPs 1 and 2 are multiplexed with each other. Each of the packs (PCKs) is a data block of 2048 byte fixed length. The number of the packs of the V_PCK 408 included in the VOBU is the number of packs necessary to a capacity in which one I picture based on the MPEG method can be stored. In a similar manner, the number of the SP_PCKs 409 and 410 corresponding to the respective substreams is the number of packs necessary to a capacity in which one sub-picture can be stored.

Figure 5:
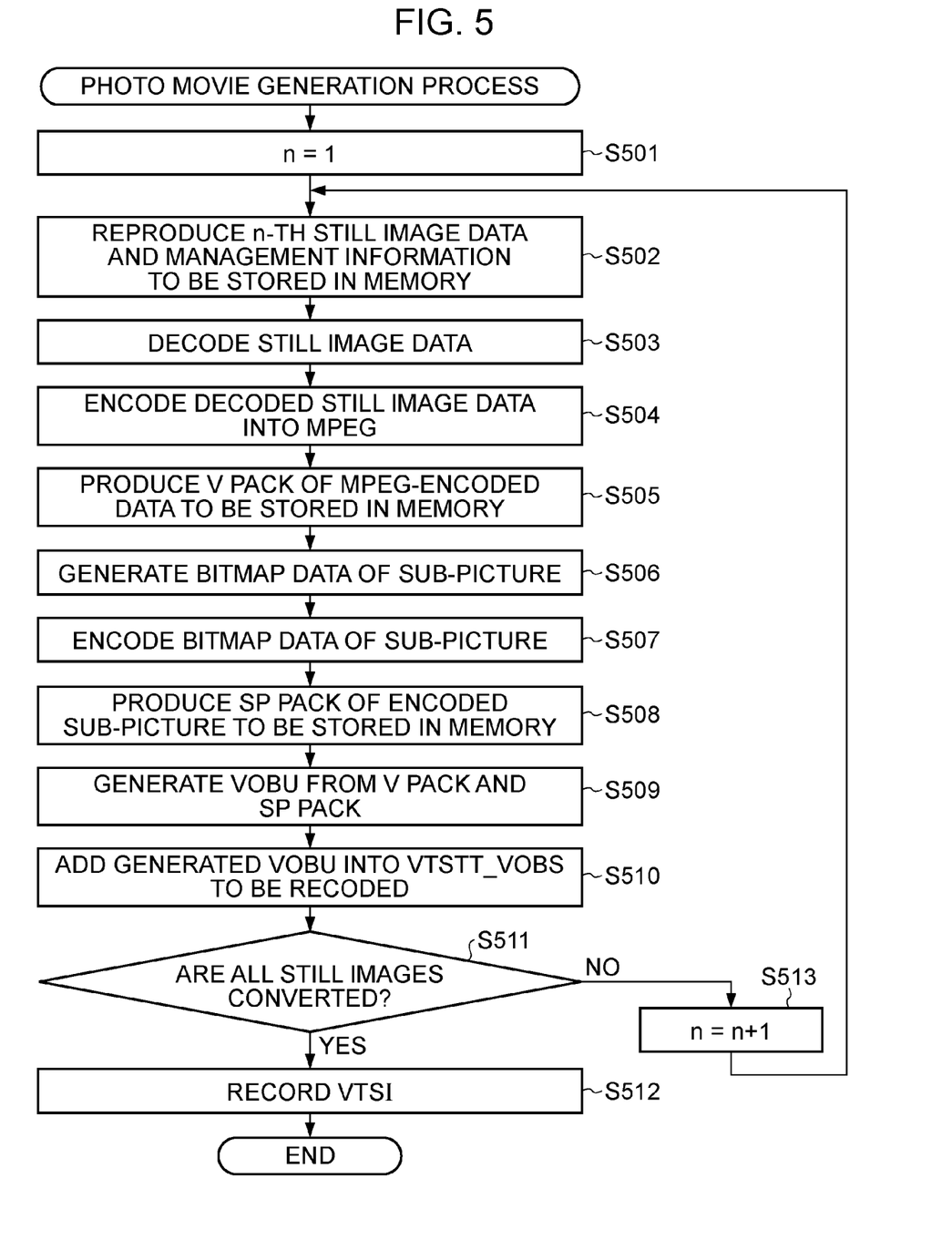
FIG. 5 is a flowchart showing a photo movie generating process.

Next, a description will be given of a procedure for generating the photo movie thus configured. FIG. 5 is a flowchart showing the photo movie generation process under the control of the control unit 101.

When the finalize process is instructed by the operation unit 112, the photo movie process is started.

First of all, a variant n for counting the number of the still image data that has been converted into the MPEG data is initialized to 1 (Step S501). Next, the n-th still image data, and, this management information of the still image data (according to this embodiment, the recording date and the file path) are reproduced from the disc D to be stored in the memory 114 (Step S502).

Next, the still image data stored in the memory 114 is decoded by the JPEG codec 106 to be stored in the memory 114 (Step S503). Then, the decoded still image data is encoded by the MPEG2 codec 105 into an I picture based on the MPEG format to be stored in the memory 114 (Step S504). Furthermore, the MPEG-converted data is converted into a V pack to be stored in the memory 114 (Step S505).

On the other hand, on the basis of the management information stored in the memory 114, bitmap data of a sub-picture 1 representing the recording date and a sub-picture 2 representing the file path is generated (Step S506). At this time, the character bitmap data, the icon bitmap data, and the like that are recorded in the flash memory 113 are used to generate the bitmap data.

Next, the respective bitmap data generated by the sub-picture encoding unit 107 are subsequently encoded to be converted into the sub-picture data before being stored in the memory 114 (Step S507). Furthermore, the encoded sub-picture data is converted into the SP pack to be stored in the memory 114 (Step S508).

Next, the V pack and the SP pack stored in the memory 114 are multiplexed with each other, and further NV pack is arranged in the head to generate VOBU (Step S509). Then, the thus generated VOBU is added to the VTSTT_VOBS to be recorded in the disc D (Step S510).

Next, it is determined whether or not the conversion process into the photo movie is executed on all the still image data recorded in the disc D (Step S511).

As a result of this determination, when the conversion process is not completed on all the still image data (NO in step S511), 1 is added to the n and the process returns to Step S502 (Step S513). On the other hand, when the conversion process is completed on all the still image data (YES in step S511), all the VOBU that should be added to the VTSTT_VOBS is recorded on the disc D. The VTIS including Cell Still Time representing the number of seconds for reproducing the still image and the VTSI_BUP as the backup of the VTIS are generated to be recorded in the disc D (Step S512).

Furthermore, the VMG for managing the data recorded in the disc D is updated. The updated VMG is recorded in the flash memory 113 and thereafter is recoded on the disc D during the finalize process.

In this way, the finalize process is executed on the DVD disc on which the photo movie is recorded and the DVD disc that can be reproduced by the general DVD reproduction apparatus is realized, whereby it is possible to browse the photo movie as well.

In the above, according to this embodiment, the description has been given of the case where the two sub-pictures are multiplexed with each other, but in the DVD video format, 32 sub-pictures can be multiplexed at maximum. Also, it is possible to create a photo movie with audio and music by recording the audio data as A_PCK (audio pack) in a multiplexing manner.

Figure 6:
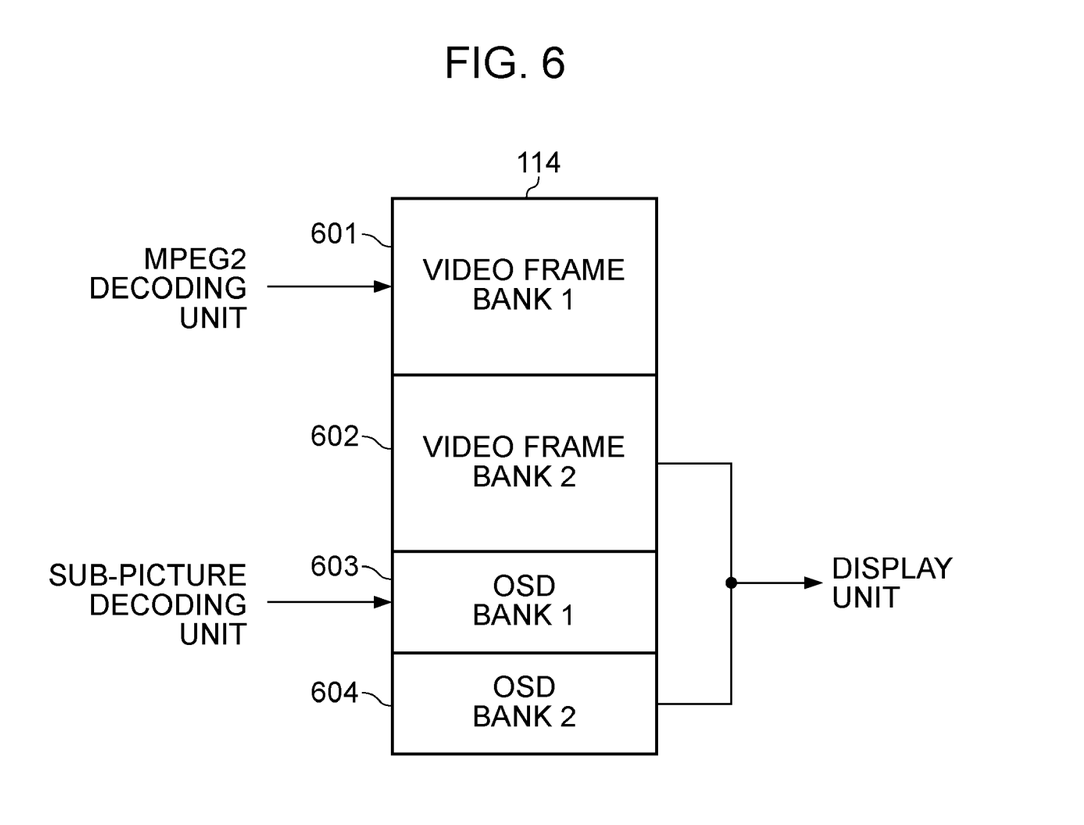
FIG. 6 shows a state of a memory during reproducing.

Next, a description will be given of reproduction of the photo movie. FIG. 6 shows a state of the memory 114 during reproducing.

When the user operates the operation unit 112 to instruct reproduction of the photo movie, the control unit 101 controls the disc control unit 111 to reproduce the VTS of the specified photo movie from the disc D. The disc control unit 112 writes the reproduced VTS to the memory 114. The MPEG2 codec 105 decodes the motion image data in the reproduced VTS data.

The decoded I picture data is written to a video frame bank 1 (601) of the memory 114 as video frame data. The sub-picture codec 107 selects the sub-picture data selected by the user from the SP pack group in the reproduced VTS data for decoding. Then, the decoded bitmap data is stored in an on screen display (OSD) bank 1 (603) of the memory 114.

In a similar manner, the next I picture and the bitmap data are respectively recorded in a video frame bank 2 (602) and an OSD bank 2 (604). At this timing, the display unit reads out the data from the video frame bank 1 and the OSD bank 1 in which the data has been recorded, and a display screen is generated by overlapping the bitmap on the still image and is then displayed. By executing the above-described process, the reproduction of the photo movie shown in FIG. 2 can be realized.

It should be noted that in the above-described embodiment, the photo movie is generated to be recorded on the disc at the time of the finalize process, but the configuration is not limited to the above, and the user may instruct the generation of the photo movie at an arbitrary timing.

Also, in the above-described embodiment, the description has been made of the apparatus for recording the image data on the DVD disc, but other recording media may also be used.

Other Embodiments According to the Present Invention

The means for constructing the recording apparatus and the steps of the recording method according to the above-described embodiment of the present invention can be realized while a program stored in a RAM or ROM of a computer is operated.

In addition, the present invention can also be realized in an embodiment as a system, an apparatus, a method, a program, or a storage medium, for example. To be more specific, the present invention may be applied to a system that is composed of a plurality of devices or to an apparatus is composed of a single device.

It should be noted that in the present invention, the program (software) with which the above-mentioned functions of the embodiment (the program corresponding to the flowchart shown in FIG. 5 in the embodiment) is supplied to the system or apparatus directly or remotely. Also, the present invention is achieved in the case where the computer of the system or apparatus reads out and executes the supplied program code.

Therefore, in order to realize the function process of the present invention by the computer, the program code itself to be installed in the computer also realizes the present invention. In other words, the present invention encompasses the computer program for realizing the function process of the present invention.

In that case, as long as the program function is provided, the present invention may be in the form of object code, a program to be executed by an interpreter, script data to be supplied to an OS, or the like.

Examples of a recording medium for supplying the program include a floppy disc, a hard disc, an optical disc, a magneto-optical (MO) disc, a CD-ROM, a CD-R, and a CD-RW. Also, the examples include a magnetic tape, a non-volatile memory card, a ROM, and a DVD (DVD-ROM, DVD-R).

In addition to the above, as a method of providing the program, a browser of a client computer is used to establish a connection to a web site of the Internet. Then, the program can also be provided from the home page while the computer program itself of the present invention or a compressed file including an automatic installment function is downloaded to a recording medium such as a hard disc.

Also, the present invention can also be realized in such a manner that the program code constituting the program of the present invention is divided into a plurality of files and the respective files are downloaded from different web sites. In other words, the present invention includes a World Wide Web (WWW) site which allows a plurality of users to download the program file for realizing the function process of the present invention in the computer.

In addition, it is also possible to realize in such a manner that the program of the present invention is encrypted and stored on a storage medium such as a CD-ROM to be distributed to the user, and users satisfying a predetermined condition may be allowed to download key information for deciphering from a web site via the Internet. Then, the encrypted program is executed by using the downloaded key information to be installed in the computer.

Moreover the functions of the above-described embodiment can be realized while the computer executes the read out program. In addition to this, an operating system (OS) running on the computer executes a part or entirety of the actual process on the basis of an instruction of the program, and the process may also realize the functions of the above-described embodiment.

Furthermore, the program read out from the recording medium can be written to a memory provided to a function expansion board inserted into the computer or a function expansion unit connected to the computer. After that, a CPU or the like provided to the function expansion board or the function expansion unit executes a part or entirety of the actual process on the basis of an instruction of the program, and the process may also realize the functions of the above-mentioned embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-103649 filed Apr. 4, 2006, which is hereby incorporated by reference herein in its entirety.

What is claimed is:

1. A recording apparatus comprising:
   a recording unit configured to record still image data and management information of the still image data in a recoding medium;
   a reproducing unit configured to reproduce the still image data and the management information from the recording medium;
   a motion image processing unit configured to generate motion image data with use of the still image data reproduced by the reproducing unit from the recording medium; and
   a sub-information processing unit configured to generate sub-information for the motion image data generated by the motion image processing unit in accordance with the management information reproduced by the reproducing unit from the recording medium, the sub-information data including information related to the still image data that is used for generating the motion image data by the motion image processing unit,
   wherein the recording unit multiplexes the motion image data generated by the motion image processing unit and the sub-information data generated by the sub-information processing unit and records the multiplexed data in the recording medium, wherein the sub-information includes recording date information of the still image data, and wherein the still image data is recorded in a file format, and the sub-information includes information of a file name of the still image data.

2. A recording apparatus according to claim 1, wherein the recording unit is configured to record the motion image data and the sub-information data in a mode capable of arbitrarily selecting whether sub-information data related to the sub-information data and a reproduced image of the motion image data are multiplexed with each other to be displayed during reproducing the motion image data.

3. A recording apparatus according to claim 1, wherein the motion image processing unit is configured to generate the motion image data with use of plural pieces of still image data reproduced from the recording medium, and the sub-information processing unit is configured to generate sub-information data related to each of the plural pieces of still image data.

4. A recording apparatus according to claim 1, further comprising:
   a display unit configured to display an image related to the motion image data and sub-information related to the sub-information data reproduced from the recording medium by the reproduction unit.

5. A recording apparatus comprising:
   a recording unit configured to record still image file and management information of the still image file in a recoding medium, the management information including information relating to a recording date of the still image file and information relating to a file path of the still image file recorded in the recording medium;
   a reproducing unit configured to reproduce the still image file and the management information from the recording medium;
   a motion image processing unit configured to generate motion image data with use of the still image file reproduced from the recording medium by the reproducing unit;
   a sub-information processing unit configured to generate sub-information data for the motion image data generated by the motion image processing unit in accordance with the management information reproduced by the reproducing unit from the recording medium, the sub-information data including first bitmap data showing the recording date of the still image data that is used for generating the motion image data by the motion image processing unit and second bitmap data showing the file path of the still image data that is used for generating the motion image data by the motion image processing unit; and a generation unit configured to generate a motion image file including the motion image data generated by the motion image processing unit and the sub-information data generated by the sub-information processing unit, wherein the recording unit records the motion image file generated by the generation unit in the recording medium.

6. A recording apparatus according to claim 5, wherein the motion image file includes a plurality of packs, the plurality of packs including a first pack in which the first bitmap data is stored, a second pack in which the second bitmap data is stored and a third pack in which the motion image data is stored.

7. A recording method comprising:

recording still image data and management information of the still image data in a recoding medium;

reproducing the still image data and the management information from the recording medium;

generating motion image data with use of the still image data reproduced by the step of reproducing from the recording medium; and generating sub-information for the motion image data in accordance with the management information reproduced from the recording medium, the sub-information data including information related to the still image data that is used for generating the motion image data, wherein recording multiplexes the motion image data and the sub-information data and records the multiplexed data in the recording medium, wherein the sub-information includes recording date information of the still image data, and wherein the still image data is recorded in a file format, and the sub-information includes information of a file name of the still image data.

8. A recording method comprising:

recording still image file and management information of the still image file in a recoding medium, the management information including information relating to a recording date of the still image file and information relating to a file path of the still image file recorded in the recording medium;

reproducing the still image file and the management information from the recording medium;

generating motion image data with use of the still image file reproduced from the recording medium;

generating sub-information data for the motion image data in accordance with the management information reproduced from the recording medium, the sub-information data including first bitmap data showing the recording date of the still image data that is used for generating the motion image data and second bitmap data showing the file path of the still image data that is used for generating the motion image data; and generating a motion image file including the motion image data and the sub-information data, wherein recording records the motion image file in the recording medium.

9. The method according to claim 7 wherein recording the still image data and management information comprises:

recording the motion image data and the sub-information data in a mode capable of arbitrarily selecting whether sub-information data related to the sub-information data and a reproduced image of the motion image data are multiplexed with each other to be displayed during reproducing the motion image data.

10. The method according to claim 7 wherein generating the sub-information for the motion image data comprises:

generating the motion image data with use of plural pieces of still image data reproduced from the recording medium, and the sub-information processing unit is configured to generate sub-information data related to each of the plural pieces of still image data.

11. The method according to claim 7 further comprising:

displaying an image related to the motion image data and sub-information related to the sub-information data reproduced from the recording medium.

12. A non-transitory computer-readable storage medium having instructions that, when executed by a processor, cause the processor to perform operations comprising:

recording still image data and management information of the still image data in a recoding medium;

reproducing the still image data and the management information from the recording medium;

generating motion image data with use of the still image data reproduced by the step of reproducing from the recording medium; and generating sub-information for the motion image data in accordance with the management information reproduced from the recording medium, the sub-information data including information related to the still image data that is used for generating the motion image data, wherein recording multiplexes the motion image data and the sub-information data and records the multiplexed data in the recording medium, wherein the sub-information includes recording date information of the still image data, and wherein the still image data is recorded in a file format, and the sub-information includes information of a file name of the still image data.

13. The storage medium according to claim 12 wherein recording still image data and management information comprises operations comprising:

recording the motion image data and the sub-information data in a mode capable of arbitrarily selecting whether sub-information data related to the sub-information data and a reproduced image of the motion image data are multiplexed with each other to be displayed during reproducing the motion image data.

14. The storage medium according to claim 12 wherein generating the sub-information for the motion image data comprises operations comprising:

generating the motion image data with use of plural pieces of still image data reproduced from the recording medium, and the sub-information processing unit is configured to generate sub-information data related to each of the plural pieces of still image data.

* * * * *